July 11, 1967    C. W. SHUMAN, JR    3,330,102
PIVOTED INDEX LATCH FOR LAWN TRIMMER-EDGER
Filed March 26, 1965
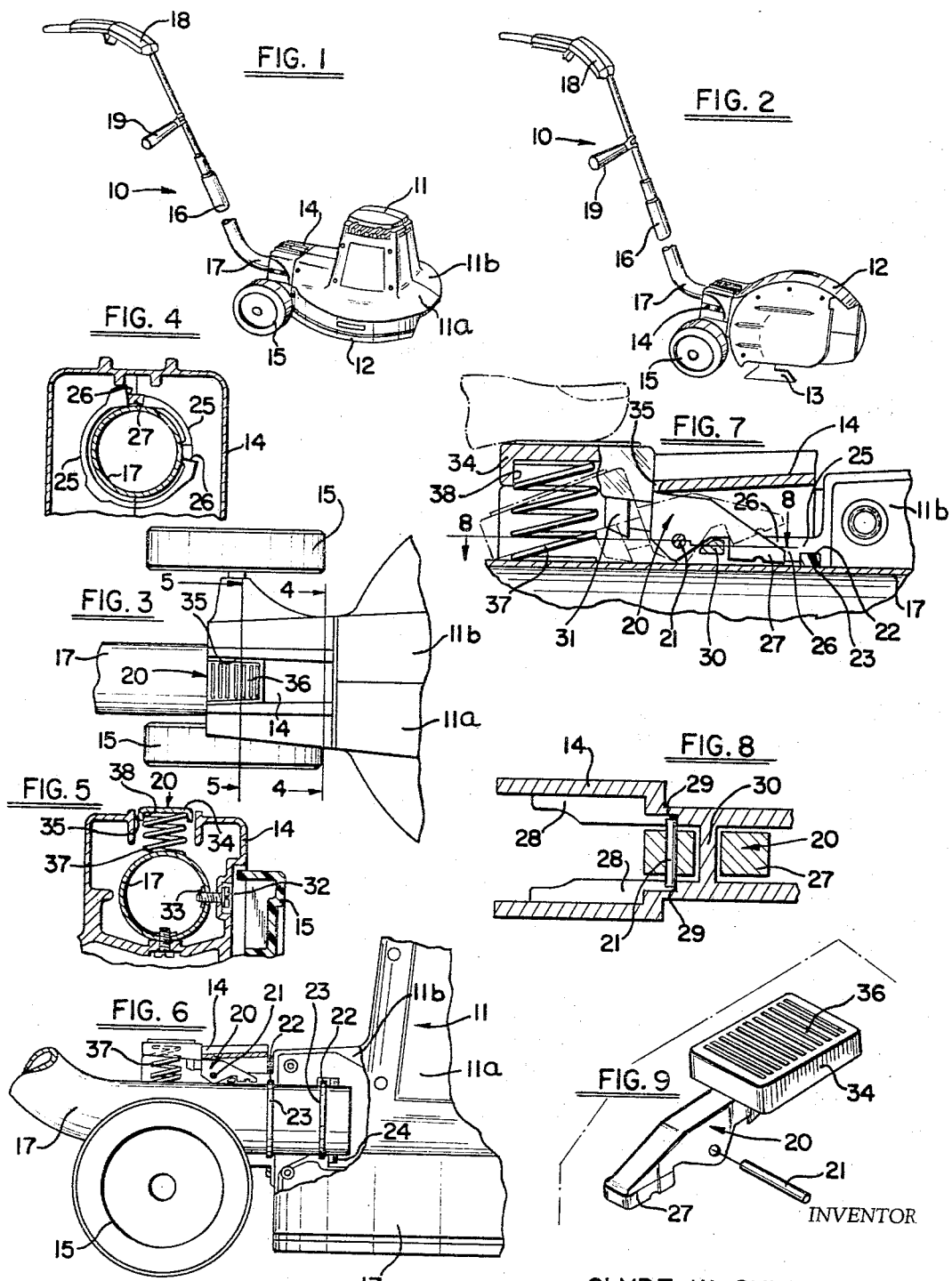
INVENTOR
CLYDE W. SHUMAN, JR.
BY Leonard Bloom
ATTORNEY

United States Patent Office 3,330,102
Patented July 11, 1967

3,330,102
PIVOTED INDEX LATCH FOR LAWN
TRIMMER-EDGER
Clyde W. Shuman, Jr., State College, Pa., assignor to The
Black and Decker Manufacturing Company, Towson,
Md., a corporation of Maryland
Filed Mar. 26, 1965, Ser. No. 443,131
7 Claims. (Cl. 56—25.4)

The present invention relates to a pivoted index latch for a power-operated lawn trimmer-edger machine, and more particularly, to a manually-manipulatable pivoted latch member which facilitates the positioning of the machine for either lawn-trimming or lawn-edging operations.

It is an object of the present invention to provide a pivoted index latch which combines the desirable advantages of a convenient, smooth, and positive operation, manufacturing economy, and durability over extended periods of usage.

The present invention finds particular utility in a lawn trimmer-edger machine; this machine generally comprises a motor housing, a wheel housing rearwardly of the motor housing, a pair of wheels carried on a transverse axle in the wheel housing, an elongated handle having a bent cylindrical portion secured within the wheel housing and preferably extending into the motor housing, means journaling the motor housing for relative rotary movement with respect to the wheel houisng, and circumferentially-spaced stop means on the motor housing. More specifically, the present invention constitutes an improvement in the latching means carried by the wheel housing and cooperating with the stop means on the motor housing to index the housings in a desired angular position relative to one another, thereby facilitating a positioning of the machine for either lawn-trimming or lawn-edging operations.

Broadly stated, this improvement in the latching means comprises a manually-manipulatable latch member pivotably supported intermediate its extremities on the wheel housing for pivotal movement about an axis which is transverse to the axis of relative rotation between the wheel housing and the motor housing. Means are provided to retain the latch member between the handle and the wheel housing, thereby preventing withdrawal of the latch member from the wheel housing and simultaneously limiting its pivotal movement. The latch member is provided with a latching portion which is disposed forwardly of its pivotably-supported portion and cooperates with the stop means on the motor housing to index the housings relative to one another. Yieldable means are provided to constantly urge the latch member towards cooperative indexing engagement with the stop means on the motor housing, and an access opening is provided in the wheel housing so as to facilitate the manipulation of the latch member against the force of the yieldable means.

In accordance with another aspect of the invention, a transverse retaining bridge is formed in the wheel housing and is nested between the pivotably-supported portion of the latch member and the forward latching portion thereof, and a stop element is carried by the latch member and depends therefrom rearwardly of its pivotably-supported portion; the stop element abuts against the handle to limit the pivotal movement of the latch member about its axis, and in cooperation with the retaining bridge, prevents the latch member from being removed from the wheel housing.

Preferably, the latch member carries a pivot pin, the ends of which project laterally beyond its respective sides, while the wheel housing has a pair of internal longitudinal guide slots which receive the respective ends of the pivot pin. The guide slots cooperate with the pivot pin to facilitate the insertion of the latch member in the wheel housing, and the guide slots have respective ends which provide abutments for the laterally-projecting ends of the pivot pin.

These and other objects of the present invention will become apparent from a reading of the following specification, taken in conjunction with the enclosed drawings, in which:

FIGURE 1 is a perspective of the power-operated lawn trimmer-edger machine positioned for a lawn-trimming operation;

FIGURE 2 is a perspective of the machine positioned for a lawn-edging operation;

FIGURE 3 is an enlarged top plan view of the wheel housing, the handle, and a portion of the motor housing;

FIGURE 4 is a transverse section view, taken along the lines 4—4 of FIGURE 3, and showing the manner in which the latch member cooperates with the stop means on the motor housing to index the housings in a desired angular position relative to one another;

FIGURE 5 is a transverse section view, taken along the lines 5—5 of FIGURE 3, showing the manner in which the handle is secured to the wheel housing, and further showing the compression spring retained between the handle and a recess formed in the rearward portion of the latch member;

FIGURE 6 is a side elevation of the structure shown in FIGURE 3, with part of the casing being broken away to illustrate the manner in which the motor housing is rotatably mounted on the bent cylindrical extension of the tubular handle (to which the wheel housing is secured) and with the index latch member of the present invention being shown in side elevation;

FIGURE 7 is an enlarged fragmentary portion of FIGURE 6, showing the manner in which the pivoted index latch member is retained between the wheel housing and the tubular handle;

FIGURE 8 is a stepped section view, taken along the lines 8—8 of FIGURE 7, showing the pivot pin carried by the latch member and received in respective guide slots formed within the wheel housing, and further showing the transverse retaining bridge formed within the wheel housing and nested between the pivot pin and the forward latching portion of the latch member; and FIGURE 9 is an exploded perspective of the index latch and its pivot pin.

With reference to FIGURES 1 and 2, there is illustrated a power-operated lawn trimmer-edger machine 10 with which the teachings of the present invention may find particular utility. The machine 10 generally comprises a motor housing 11 including complementary mating halves 11a and 11b detachably secured together along a common longitudinal midplane, a peripheral skirt 12 depending from the motor housing and enclosing a rotary blade (not shown), a guide member 13 to facilitate use of the machine as a lawn edger as shown in FIGURE 2, a wheel housing 14 disposed rearwardly of the motor housing, a pair of wheels 15 carried by the wheel housing on a transverse axle, an elongated handle 16 having a bent cylindrical portion 17 secured to the wheel housing, an upper control handle 18, and an auxiliary hand grip 19 to facilitate the manual operation and control of the machine.

With reference to FIGURES 7 and 9, the wheel housing 14 encloses the pivotably-supported manually-manipulatable latch member 20 of the present invention. The latch member 20 is provided with a piovt pin 21 by means of which the latch member is pivotably supported intermediate its extremities in the wheel housing 14 for pivotal movement about an axis which is transverse to the axis of relative rotation between the motor housing 11 and the wheel housing 14. The manner in which the latch member 20 is retained in the wheel housing, and the manner in which the latch member cooperates with the stop means on the motor housing, will hereinafter be explained in detail.

With reference to FIGURES 3, 4, 5, and 6, the bent cylindrical portion 17 of the elongated handle is secured to the wheel housing 14 and preferably projects within the rear portion of the motor housing 11. Each one of the complementary mating halves 11a and 11b of the motor housing is provided with a pair of spaced-apart semi-annular recesses 22, and it will be appreciated that when the mating halves 11a and 11b of the motor housing are brought together, these semi-annular recesses 22 will form a pair of spaced-apart parallel substantially-annular bearing seats. A deformable ring 23, preferably molded from a suitable plastic material, is carried by the bent cylindrical portion 17 of the elongated handle and is received within each of the bearing seats as shown in FIGURE 6. Each ring 23 provides a combination tolerance ring and bearing journal member between the longitudinally-split motor housing 14 and the bent cylindrical portion 17 of the elongated handle, that is, it provides a smooth journal for rotatably supporting the motor housing with respect to the handle portion (and hence to the wheel housing) and simultaneously, it accommodates tolerance accumulations between the motor housing and the handle. The ring 23 is described more particularly in the co-pending Sheps application Ser. No. 437,030, filed Mar. 4, 1965, entitled "Combination Tolerance Ring and Bearing Journal Member," and assigned to the assignee of the present invention. The bent cylindrical portion 17 of the elongated handle is further provided with a transverse roll pin 24 to preclude its axial withdrawal from the motor housing 11.

Each of the mating halves 11a and 11b of the motor housing has a rearwardly-extending semi-annular rib 25, see FIGURES 6 and 7; and it will be appreciated that when the mating halves are brought together, a rearwardly-extending index collar is formed on the motor housing 11 and is enclosed within the wheel housing 14. A pair of circumferentially-spaced stops 26, see FIGURE 4 again, are provided on the index collar, preferably 90° apart, and these stops 26 cooperate with the forward portion 27 of the pivoted latch member 20, as shown in FIGURES 4 and 7, to index the motor housing 11 and the wheel housing 14 in a desired angular position relative to one another. The manner of journaling the cylindrical portion 17 of the elongated handle between the complementary mating halves 11a and 11b of the longitudinally-split motor housing, and the manner in which the rearwardly-extending index collar is formed between the mating halves and is enclosed within the wheel housing, forms no part of the present invention; but rather, is detailed in the co-pending Sheps et al. application Ser. No. 442,908, filed Mar 26, 1965, entitled "Power-Operated Lawn Trimmer-Edger," and assigned to the assignee of the present invention.

With reference to FIGURES 7, 8, and 9, the ends of the pivot pin 21, which is carried by the latch member 20, project laterally beyond the respective sides of the latch member, see FIGURE 8, and are received, respectively, within a pair of internal longitudinal guide slots 28 formed within the wheel housing 14. The latch member 20 is inserted within the wheel housing so that the laterally-projecting ends of its pivot pin 21 are slidably guided in the respective guide slots 28 and substantially abut against the respective ends 29 of the guide slots 28. Thereafter, when the bent cylindrical portion 17 of the elongated handle is inserted within the wheel housing 14 and is secured thereto, as hereinafter detailed, the latch member 20 will be trapped or retained within the wheel housing 14.

The wheel housing 14 has an internal retaining bridge 30, preferably cast integrally within the wheel housing 14. This retaining bridge 30, see FIGURES 7 and 8, is disposed transversely of the latch member 20 and is nested between the pivotably-supported portion of the latch member and the forward latching portion 27 thereof. A stop element 31, see FIGURE 7 again, is carried by the latch member 20 rearwardly of its pivotably-supported portion, and the stop element 31 depends from the latch member 20 and is adapted to abut against the bent cylindrical portion 17 of the elongated handle. The abutment between the stop element 31 and the handle portion 17, together with the transverse retaining bridge 30, prevent the withdrawal of the latch member 20 from the wheel housing and simultaneously limit its pivoting movement as is indicated by the broken lines in FIGURE 7.

In the assembly procedure, as detailed in the aforementioned Sheps et al. application, the latch member 20 is first inserted within the wheel housing 14, and then the bent cylindrical portion 17 of the elongated handle is inserted within the wheel housing to trap the latch member within the wheel housing. As shown in FIGURE 5, the wheel housing 14 is secured to the handle portion 17 by screws 32 that are received within tapped recesses formed in respective clamp plates 33 within the handle portion. When the handle portion 17 is removed from the wheel housing 14, the latch member 20 may be pivoted a greater degree on its pin 21 (since the stop element 31 no longer abuts against the handle) and thereafter, the forward portion 27 of the latch member will clear the transverse retaining bridge 30, thereby allowing the latch member 20 to be removed from the wheel housing 14.

The latch member 20 has a rearward portion 34 which projects through an access opening 35 formed in the wheel housing 14, see FIGURE 7, and the rearward portion 34 of the latch member 20 has its upper exposed surface formed with a series of serrations 36 to facilitate a convenient manual manipulation thereof. Yieldable means, such as a compression spring 37, is nested within a recess 38 formed within the rearward portion 34 of the latch member 20, and the spring 37 is retained between the latch member 20 and the handle portion 17 and constantly urges the latch member 20 into cooperating indexing engagement with the stop means 26 formed on the indexing collar 25 of the motor housing 11. The latch member 20 may be depressed against the spring 37, see FIGURE 7 again, so as to pivot the latch member about its pivot pin 21, thereby releasing the forward latching portion 27 of the latch member 20 from engagement with the stop means 26 on the indexing collar 25; and then the entire motor housing 11 may be pivoted about the axis of the bent cylindrical portion 17 of the elongated handle and indexed into an alternate substantially 90° position. This accommodates a convenient adjustment of the machine 10 for either lawn-trimming or lawn-edging operations.

Obviously, many modifications may be made without departing from the basic spirit of the present invention; and accordingly, within the scope of the appended claims, the invention may be practiced other than has been specifically described herein.

I claim:
1. In a lawn trimmer-edger comprising a motor housing, a wheel housing rearwardly of the motor housing, an elongated handle having a portion mounted within the wheel housing, means journaling the motor housing for relative rotary movement with respect to the wheel housing, and circumferentially-spaced stop means on the motor housing; the improvement in latching means carried by the wheel housing and cooperating with the stop means on the motor housing to index the housings in a desired angular position relative to one another, comprising:
    (a) a manually-manipulatable latch member pivotably supported intermediate its extremities on the wheel housing for pivotal movement about an axis which is transverse to the axis of relative rotation between the housings;
(b) means retaining said latch member between the handle and the wheel housing; said means limiting the pivotal movement of said latch member about its pivot axis;
(c) said latch member having a latching portion disposed forwardly of its pivotably-supported portion and cooperating with the stop means on the motor housing to index the housings relative to one another;
(d) yieldable means constantly urging said latch member towards cooperative indexing engagement with the stop means; and
(e) means in the wheel housing providing an access opening to facilitate the manipulation of said latch member against said yieldable means.

2. The improvement of claim 1, wherein:
(a) said latch member has a pivot pin secured thereto, the ends of which project laterally beyond the respective sides of said latch member; and wherein:
(b) the wheel housing has a pair of internal longitudinal guide slots receiving said respective laterally-projecting ends of said pivot pin, whereby said latch member is received within the wheel housing; and wherein:
(c) said guide slots have respective ends providing abutments for said laterally-projecting ends of said pivot pin.

3. The improvement of claim 1, wherein said means retaining said latch member between the handle and the wheel housing, comprises:
(a) a retaining bridge formed within the wheel housing;
(b) said bridge being disposed transversely of said latch member and being nested between the pivotably-supported portion of said latch member and said latching portion thereof; and
(c) a stop element carried by said latch member rearwardly of its pivotably-supported portion and cooperating with the handle to limit the pivoting movement of said latch member against said yieldable means and is one direction about its pivot axis, whereby said retaining bridge prevents said latch member from being removed from the wheel housing.

4. In a lawn trimmer-edger comprising a motor housing, a wheel housing rearwardly of the motor housing, an elongated handle having a portion mounted within the wheel housing, means journaling the motor housing for relative rotary movement with respect to the wheel housing, and circumferentially-spaced stop means on the motor housing; the improvement in latching means carried by the wheel housing and cooperating with the stop means on the motor housing to index the housings in a desired angular position relative to one another, comprising:
(a) a latch member having an intermediate pivotably-supported portion carried by the wheel housing for pivotal movement about an axis transverse to the axis of relative rotation between the housings;
(b) said latch member having a latching portion disposed forwardly of its pivotably-supported portion and cooperating with the stop means on the motor housing to index the housings relative to one another;
(c) a transverse retaining bridge carried by the wheel housing and being nested between the pivotably-supported portion of said latch member and said latching portion thereof;
(d) a stop element carried by said latch member, depending therefrom rearwardly of said pivotably-supported portion of said latch member, and cooperating with the handle to limit the pivotal movement of said latch member about its pivot axis, whereby said retaining bridge prevents said latch member from being removed from the wheel housing; and
(e) yieldable means constantly urging said latch member towards cooperative indexing engagement with the stop means on the motor housing.

5. The improvement of claim 4, wherein said yieldable means comprises:
(a) a spring disposed rearwardly of said stop element on said latch member;
(b) said spring being retained between the handle and a recess formed within said latch member.

6. The improvement of claim 4, wherein:
(a) the wheel housing has an access opening formed therein; and wherein:
(b) said latch member has a manually-manipulatable portion rearwardly of its pivotably-supported portion and extending through said access opening;
(c) said manually-manipulatable portion of said latch member having an exposed surface provided with serrations.

7. In a lawn trimmer-edger comprising a motor housing, a wheel housing rearwardly of the motor housing, an elongated handle having a portion mounted within the wheel housing, means journaling the motor housing for relative rotary movement with respect to the wheel housing, and circumferentially-spaced stop means on the motor housing; the improvement in latching means carried by the wheel housing and cooperating with the stop means on the motor housing to index the housing in a desired angular position relative to one another, comprising:
(a) a manually-manipulatable latch member pivotably supported intermediate its extremities on the wheel housing for pivotal movement about an axis which is transverse to the axis of relative rotation between the housings;
(b) said latch member having a latching portion disposed forwardly of its pivotably-supported portion and cooperating with the stop means on the motor housing to index the housings relative to one another;
(c) means in the wheel housing forming an access opening therein;
(d) said latch member having a manually-manipulatable portion rearwardly of its pivotably-supported portion and extending through said access opening in the wheel housing;
(e) said manually-manipulatable portion of said latch member having an exposed surface formed with serrations; and
(f) yieldable means between the handle and said manually-manipulatable portion of said latch member constantly urging said latch member into cooperative indexing engagement with the stop means on the motor housing.

References Cited
UNITED STATES PATENTS

| | | | |
|---|---|---|---|
| 2,682,414 | 6/1954 | Richardson | 279—77 |
| 2,759,319 | 8/1956 | Smith | 56—25.4 |
| 2,815,049 | 12/1957 | Herscovitch | 143—43.50 |
| 3,221,781 | 12/1965 | Mattson et al. | 56—25.4 |

ABRAHAN G. STONE, Primary Examiner.

P. RAZZANO, Assistant Examiner.